United States Patent
Yip et al.

(10) Patent No.: US 11,606,576 B2
(45) Date of Patent: Mar. 14, 2023

(54) METHOD AND APPARATUS FOR GENERATING MEDIA FILE COMPRISING 3-DIMENSIONAL VIDEO CONTENT, AND METHOD AND APPARATUS FOR REPLAYING 3-DIMENSIONAL VIDEO CONTENT

(71) Applicant: Samsung Electronics Co., Ltd., Suwon-si (KR)

(72) Inventors: Eric Yip, Suwon-si (KR); Jaehyeon Bae, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/278,951

(22) PCT Filed: Oct. 8, 2019

(86) PCT No.: PCT/KR2019/013208
§ 371 (c)(1),
(2) Date: Mar. 23, 2021

(87) PCT Pub. No.: WO2020/076058
PCT Pub. Date: Apr. 16, 2020

(65) Prior Publication Data
US 2022/0053216 A1 Feb. 17, 2022

Related U.S. Application Data

(60) Provisional application No. 62/742,578, filed on Oct. 8, 2018.

(51) Int. Cl.
H04N 19/597 (2014.01)
H04N 19/70 (2014.01)
(Continued)

(52) U.S. Cl.
CPC ........... *H04N 19/597* (2014.11); *G06T 15/00* (2013.01); *H04N 19/70* (2014.11); *H04N 21/84* (2013.01);
(Continued)

(58) Field of Classification Search
CPC ...... H04N 19/597; H04N 19/70; H04N 21/84; H04N 21/8455
See application file for complete search history.

(56) References Cited

U.S. PATENT DOCUMENTS 8,786,593 B2 7/2014 Joung et al.
8,842,903 B2 9/2014 Hwang et al.
(Continued)

FOREIGN PATENT DOCUMENTS

CN 101388988 A 3/2009
CN 106973569 A 7/2017
(Continued)

OTHER PUBLICATIONS

International Search Report and Written Opinion dated Jan. 20, 2020, issued in International Patent Application No. PCT/KR2019/013208.
(Continued)

*Primary Examiner* — Richard T Torrente
(74) *Attorney, Agent, or Firm* — Jefferson IP Law, LLP

(57) ABSTRACT

The present disclosure relates to a method and a device for generating and transmitting a media file containing three-dimensional (3D) video content. The present disclosure also relates to a method and a device for reconstructing and reproducing three-dimensional video content from a received media file. According to an aspect of an embodiment of the present disclosure, a method of generating a media file containing three-dimensional video content may include inserting, into a media data box in the media file, a
(Continued)

plurality of components contained in a two-dimensional video frame in which the three-dimensional video content is compressed; inserting, into a metadata box in the media file, first tracks respectively corresponding to the components and a second track containing metadata; and inserting, into the second track, information about an entry point for each of the plurality of components.

16 Claims, 8 Drawing Sheets

(51) Int. Cl.
  G06T 15/00    (2011.01)
  H04N 21/84    (2011.01)
  H04N 21/845   (2011.01)
  G06T 15/10    (2011.01)

(52) U.S. Cl.
  CPC ......... H04N 21/8455 (2013.01); *G06T 15/10* (2013.01)

(56) References Cited

U.S. PATENT DOCUMENTS

| | | | |
|---|---|---|---|
| 8,933,925 | B2 | 1/2015 | Sinha et al. |
| 2008/0252719 | A1 | 10/2008 | Choi et al. |
| 2013/0081095 | A1 | 3/2013 | Kitazato |
| 2015/0287246 | A1 | 10/2015 | Huston et al. |
| 2016/0232939 | A1 | 8/2016 | Malamal Vadakital et al. |
| 2017/0094262 | A1 | 3/2017 | Peterson et al. |
| 2018/0048877 | A1 | 2/2018 | Lai et al. |
| 2020/0013235 | A1* | 1/2020 | Tsai .......................... G06T 7/73 |
| 2020/0014940 | A1* | 1/2020 | Dawar .................... G06T 9/001 |
| 2020/0014953 | A1* | 1/2020 | Mammou .............. H04N 19/59 |
| 2020/0104976 | A1* | 4/2020 | Mammou ................. G06T 3/40 |
| 2021/0235056 | A1* | 7/2021 | Takahashi ........ H04N 21/21805 |

FOREIGN PATENT DOCUMENTS

| | | |
|---|---|---|
| CN | 107534801 A | 1/2018 |
| KR | 10-2009-0035794 A | 4/2009 |
| KR | 10-2009-0060922 A | 6/2009 |
| KR | 10-2012-0031012 A | 3/2012 |
| KR | 10-2012-0118622 A | 10/2012 |
| KR | 10-2013-0108080 A | 10/2013 |
| WO | 2009/048235 A2 | 4/2009 |

OTHER PUBLICATIONS

Ahmed Hamza et al (INTERDIGITAL): "[PCC][Systems] ISOBMFF Container for V-PCC Bitstreams",(Oct. 1, 2018), XP030191625.
Lauri Ilola et al (NOKIA): "Carriage of MPEG V-PCC bitstreams in ISOBMFF", (Oct. 4, 2018), XP030192424.
Yiling Xu et al: "Layered encapsulation of point cloud for Category 2", (Oct. 3, 2018), XP030192069.
Eric Yip et al (SAMSUNG): "Carriage of PCC in ISO Base Media File Format",(Oct. 4, 2018), XP030192451.
"First idea on Systems technologies for Point Cloud Coding",(Apr. 30, 2018), XP030024302.
Emre B Aksu et al (Nokia): "[PCC] On high level syntax of PCC", (Jul. 11, 2018), XP030196816.
Emre B Aksu et al: [PCC] On high level syntax of V-PCC, (Oct. 4, 2018), XP030192423.
Ryohei Takahashi et al: "On Encapsulation of V-PCC Bitstream in Single ISOBMFF Track", (Oct. 6, 2018), XP030215716.
Extended European Search Report dated Aug. 23, 2021, issued in European Patent Application No. 19872037.7-1209.
Chinese Office Action dated Jan. 20, 2023, issued in Chinese Patent Application No. 201980066274.1.

* cited by examiner

METHOD AND APPARATUS FOR GENERATING MEDIA FILE COMPRISING 3-DIMENSIONAL VIDEO CONTENT, AND METHOD AND APPARATUS FOR REPLAYING 3-DIMENSIONAL VIDEO CONTENT

TECHNICAL FIELD

The present disclosure relates to a method and device for generating and transmitting a media file containing three-dimensional (3D) video content. Furthermore, the present disclosure relates to a method and device for reconstructing and reproducing three-dimensional video content from a received media file.

BACKGROUND ART

A point cloud refers to a set of a large amount of points, and a large-volume three-dimensional data may be represented by a point cloud. The point cloud is used for expressing a point in a three-dimensional space by using values different from those used in a two-dimensional image, and is in the form of a vector that can simultaneously contain position coordinates and colors of a point. For example, a point of the point cloud may be represented by (x, y, z, R, G, B). A significantly large amount of color and position data constitutes a spatial configuration of the point cloud, and as the density thereof increases, the point cloud becomes more detailed with respect to data and more meaningful as a three-dimensional model.

Because a point cloud expressing three-dimensional data requires a considerable amount of memory and processor resources, a method of compressing a point cloud is demanded to transmit the point cloud. Therefore, a method of efficiently compressing three-dimensional data is required. Furthermore, a method of processing three-dimensional data is required.

DESCRIPTION OF EMBODIMENTS

Technical Problem

In order to carry point cloud content according to an existing media file format, a new format suitable for data of a new format called 'point cloud' needs to be defined.

Solution to Problem

According to an aspect of an embodiment of the present disclosure, a method of generating a media file containing three-dimensional video content may include: inserting, into a media data box in the media file, a plurality of components contained in a two-dimensional video frame in which the three-dimensional video content is compressed; inserting, into a metadata box in the media file, first tracks respectively corresponding to the components, and a second track containing metadata; and inserting, into the second track, information about an entry point for each of the plurality of components.

BEST MODE

Figure 1:
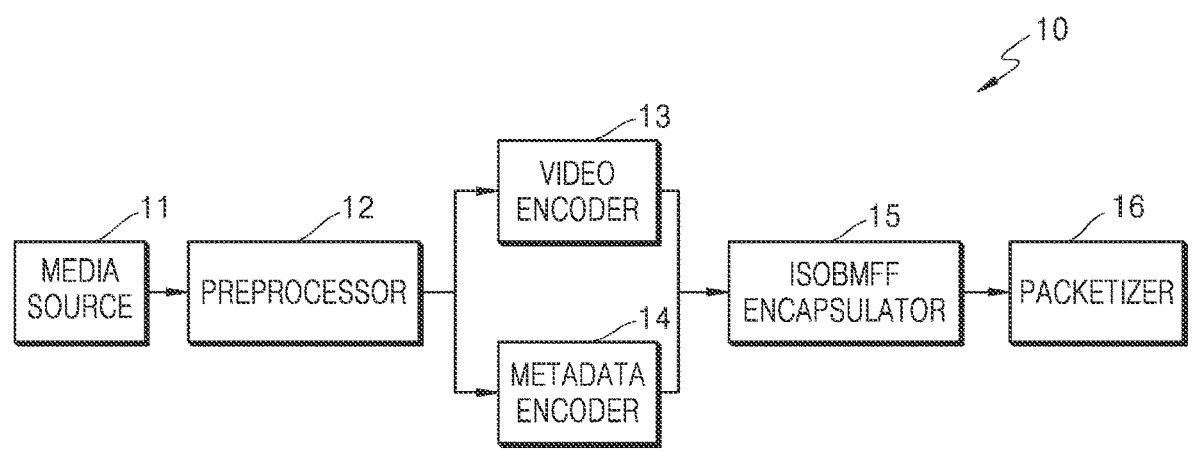
FIG. 1 illustrates an operation, performed by a transmission device, of compressing and transmitting three-dimensional video content, according to an embodiment of the present disclosure.

According to an aspect of an embodiment of the present disclosure, a method of generating a media file containing three-dimensional video content may include: inserting, into a media data box in the media file, a plurality of components contained in a two-dimensional video frame in which the three-dimensional video content is compressed; inserting, into a metadata box in the media file, first tracks respectively corresponding to the components, and a second track containing metadata; and inserting, into the second track, information about an entry point for each of the plurality of components.

According to an aspect of an embodiment of the present disclosure, a method of transmitting three-dimensional video content may include: generating a two-dimensional video frame in which three-dimensional video content containing point cloud data is compressed, and metadata necessary to reconstruct the three-dimensional content from the two-dimensional video frame; encoding the two-dimensional video frame; encapsulating the encoded two-dimensional video frame, and the metadata into a media file; and packetizing and transmitting encapsulated data, wherein the encapsulating may include: inserting, into a media data box in the media file, a plurality of components contained in the encoded two-dimensional video frame; and inserting, into a metadata box in the media file, first tracks respectively corresponding to the plurality of components, and a second track corresponding to the metadata, wherein the second track may provide an entry point for each of the plurality of components, when the media file is parsed.

According to an aspect of an embodiment of the present disclosure, a device for transmitting three-dimensional video content may include: at least one processor configured to generate a two-dimensional video frame in which the three-dimensional video content containing point cloud data is compressed, and metadata necessary to reconstruct the three-dimensional content from the two-dimensional video frame, encode the two-dimensional video frame, encapsulate the encoded two-dimensional video frame and the metadata into a media file, and packetize encapsulated data; and a communicator configured to transmit the packetized data, wherein the at least one processor may be further configured to generate the media file by inserting, into a media data box in the media file, a plurality of components contained in the encoded two-dimensional video frame, and inserting, into a metadata box in the media file, first tracks respectively corresponding to the plurality of components, and a second track corresponding to the metadata, and the second track may provide an entry point for each of the plurality of components when the media file is parsed.

According to an aspect of an embodiment of the present disclosure, a method of receiving three-dimensional video content may include: reconstructing a media file by processing received packets; parsing the media file to extract an encoded two-dimensional video frame and metadata; decoding the encoded two-dimensional video frame; and reconstructing and outputting three-dimensional video content based on the two-dimensional video frame and the metadata, wherein the parsing of the media file may include: identifying a media data box and a metadata box contained in the media file; identifying, from the metadata box, first tracks respectively corresponding to a plurality of components contained in the encoded two-dimensional video frame, and a second track containing the metadata; and identifying, from the second track, an entry point for each of the plurality of components in the media data box.

According to an aspect of an embodiment of the present disclosure, a device for receiving three-dimensional video content may include: a communicator configured to receive packetized data; and at least one processor configured to reconstruct a media file by processing the packetized data, parse the media file to extract an encoded two-dimensional video frame and metadata, decode the encoded two-dimensional video frame, and reconstruct and output three-dimensional video content based on the two-dimensional video frame and the metadata, wherein the at least one processor may be further configured to identify a media data box and a metadata box contained in the media file, identify, from the metadata box, first tracks respectively corresponding to a plurality of components contained in the encoded two-dimensional video frame, and a second track containing the metadata, and identify, from the second track, an entry point for each of the plurality of components in the media data box.

MODE OF DISCLOSURE

Hereinafter, embodiments of the present disclosure will now be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. Also, parts in the drawings unrelated to the detailed description are omitted to ensure clarity of the present disclosure, and like reference numerals in the drawings denote like elements.

Some embodiments of the present disclosure may be represented by functional block components and various processing operations. Some or all of the functional blocks may be implemented with various numbers of hardware and/or software components configured to perform specified functions. For example, the functional blocks of the present disclosure may be embodied by at least one microprocessor or by circuit components for a certain function. Also, for example, the functional blocks of the present disclosure may be implemented by using various programming or scripting languages. The functional blocks may be implemented with algorithms executed in at least one processor. Further, the present disclosure may employ the related art for electronic configuration, signal processing, and/or data processing.

Also, connection lines or connection members between components shown in the drawings are merely illustrative of functional connections and/or physical or circuit connections. In an actual device, connections between components may be represented by various functional connections, physical connections, or circuit connections that may be replaced or added.

Throughout the present specification, the term "image" may include a still image, a moving image, a video frame, and/or a video stream, and may include both of a two-dimensional frame and a three-dimensional frame. For example, "image" may include a three-dimensional frame represented by a point cloud or an omnidirectional media frame.

The term "image" used throughout the present specification is an inclusive term to denote various forms of video or image information that may be known in the related art, such as a "picture", a "frame", a "field", or a "slice". For example, "image" may mean one of a plurality of pictures or a plurality of frames constituting video content or mean whole video content containing a plurality of pictures or a plurality of frames.

Hereinafter, the present disclosure will be described in detail with reference to the accompanying drawings.

FIG. 1 illustrates an operation, performed by a transmission device, of compressing and transmitting three-dimensional video content, according to an embodiment of the present disclosure.

Referring to FIG. 1, a media source 11 of a transmission device 10 according to an embodiment of the present disclosure may obtain one or more three-dimensional objects that has been captured by itself or pre-stored. The three-dimensional objects may be, for example, polygon file format (ply) files containing point cloud data. The point cloud refers to image data represented by a set of points (or voxels) having color values in a three-dimensional space. The three-dimensional object may be three-dimensional video content containing a plurality of point cloud frames.

A preprocessor 12 of the transmission device 10 according to an embodiment of the present disclosure may perform a preprocessing operation for compressing the three-dimensional object by using a two-dimensional video encoder. The preprocessor 12 may output, from the three-dimensional objects, a video frame to be used as an input of a video encoder 13, and metadata necessary for a reception device to reconstruct the three-dimensional objects.

The preprocessor 12 may generate at least one two-dimensional image by projecting three-dimensional image data included in the three-dimensional objects onto a two-dimensional plane. The preprocessor 12 according to an embodiment of the present disclosure may project an omnidirectional image a three-dimensional space onto a rectangular picture of a predefined format. The preprocessor 12 may generate a two-dimensional video frame from the projected two-dimensional image.

For example, the preprocessor 12 may generate patches by projecting a plurality of points included in a three-dimensional point cloud onto a two-dimensional plane. The plurality of points included in the three-dimensional point cloud may be grouped based on at least one of a direction of a normal vector of each point, a position of each point, or a color of each point. The preprocessor 12 may generate the patches by projecting the grouped points onto the plane. The preprocessor 12 may generate a geometry image, a texture image, and an occupancy map image by classifying high-similarity patches, and collecting and packing the classified patches. The geometry image may indicate position information of the points included in the point cloud, and the texture image may indicate color information of the points. The occupancy map image may indicate information about pixels having information about the point cloud, from among pixels of the geometry image and the texture image.

The preprocessor 12 may output the video frame including the geometry image, the texture image, and the occupancy map image, and the metadata necessary for the reception device to reconstruct the three-dimensional objects. For example, the preprocessor 12 may output auxiliary information as the metadata.

Next, the transmission device 10 according to an embodiment of the present disclosure may compress the video frame and the metadata by using the video encoder 13 and a metadata encoder 14. Depending on implementation, the transmission device 10 may include two or more video encoders 13 or may not include the metadata encoder 14.

An ISOBMFF encapsulator 15 of the transmission device 10 according to an embodiment of the present disclosure may encapsulate, into a media file, video data and the metadata compressed by the video encoder 13 and the metadata encoder 14. For example, the ISOBMFF encapsulator 15 may encapsulate the compressed video data and the compressed metadata, into an ISOBMFF media file.

A packetizer 16 of the transmission device 10 according to an embodiment of the present disclosure may packetize the encapsulated media file and transmit the packetized media file. For example, the packetizer 16 may transmit a bitstream containing packets generated according to an MPEG media transport (MMT) scheme.

The transmission device 10 according to an embodiment of the present disclosure may compress the video frame by using one or more video codecs so as to provide the same content to reception devices with different capabilities. In this case, one ISOBMFF file may contain only a piece of video data generated by using one video codec, or may contain all pieces of video data generated by using a plurality of video codecs.

In a case where one ISOBMFF file contains all pieces of video data generated by using a plurality of video codecs, for example, the reception device may perform decoding selectively by selecting one of the video codecs. As another example, a processing entity in a network between the transmission device and the reception device may modify the file to contain only video data generated by using a certain video codec according to a request of the reception device or pre-shared preference information, and then transmit the modified file.

Figure 2:
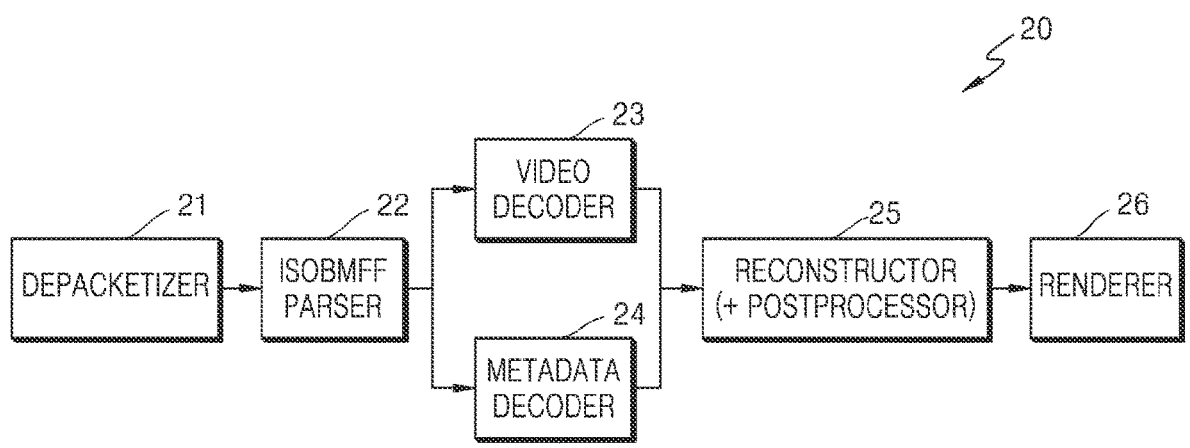
FIG. 2 illustrates an operation, performed by a reception device, of receiving and outputting three-dimensional video content, according to an embodiment of the present disclosure.

FIG. 2 illustrates an operation, performed by the reception device, of receiving and outputting three-dimensional video content, according to an embodiment of the present disclosure.

A depacketizer 21 of a reception device 20 according to an embodiment of the present disclosure may process received packets to reconstruct the media file. Alternatively, the depacketizer 21 may process a packet as it is received, without waiting for all packets constituting the media file. For example, the depacketizer 21 may reconstruct the ISOBMFF file by processing the received packets.

An ISOBMFF parser 22 of the reception device 20 according to an embodiment of the present disclosure may process all or part of the reconstructed media file to extract encoded video data and encoded metadata. The ISOBMFF parser 22 may extract the encoded video data and the encoded metadata from the reconstructed ISOBMFF file.

The reception device 20 according to an embodiment of the present disclosure may decode the encoded video data and the encoded metadata by using a video decoder 23 and a metadata decoder 24.

A reconstructor 25 of the reception device 20 according to an embodiment of the present disclosure may reconstruct the three-dimensional objects by using decoded video data and decoded metadata. The reception device 20 according to an embodiment of the present disclosure may further include a postprocessor for improving, for example, image quality.

For example, the video data may contain a texture image, a geometry image, and an occupancy map image, and the metadata may contain auxiliary information including patch information. The reconstructor 25 according to an embodiment of the present disclosure may reconstruct geometry of points by using the geometry image, the occupancy map image, and the auxiliary information. The reconstructor 25 may reconstruct the point cloud based on the reconstructed geometry and the texture image.

A renderer 26 of the reception device 20 according to an embodiment of the present disclosure may display a three-dimensional image on a screen by rendering reconstructed three-dimensional objects.

As described with reference to FIG. 1, in order to transmit three-dimensional video content, the transmission device 10 according to an embodiment of the present disclosure may compress the three-dimensional video content into two-dimensional video data and encapsulate the compressed data according to a predefined media file format. According to an embodiment of the present disclosure, a compressed point cloud may be encapsulated in an ISOBMFF file and transmitted.

Figure 3:
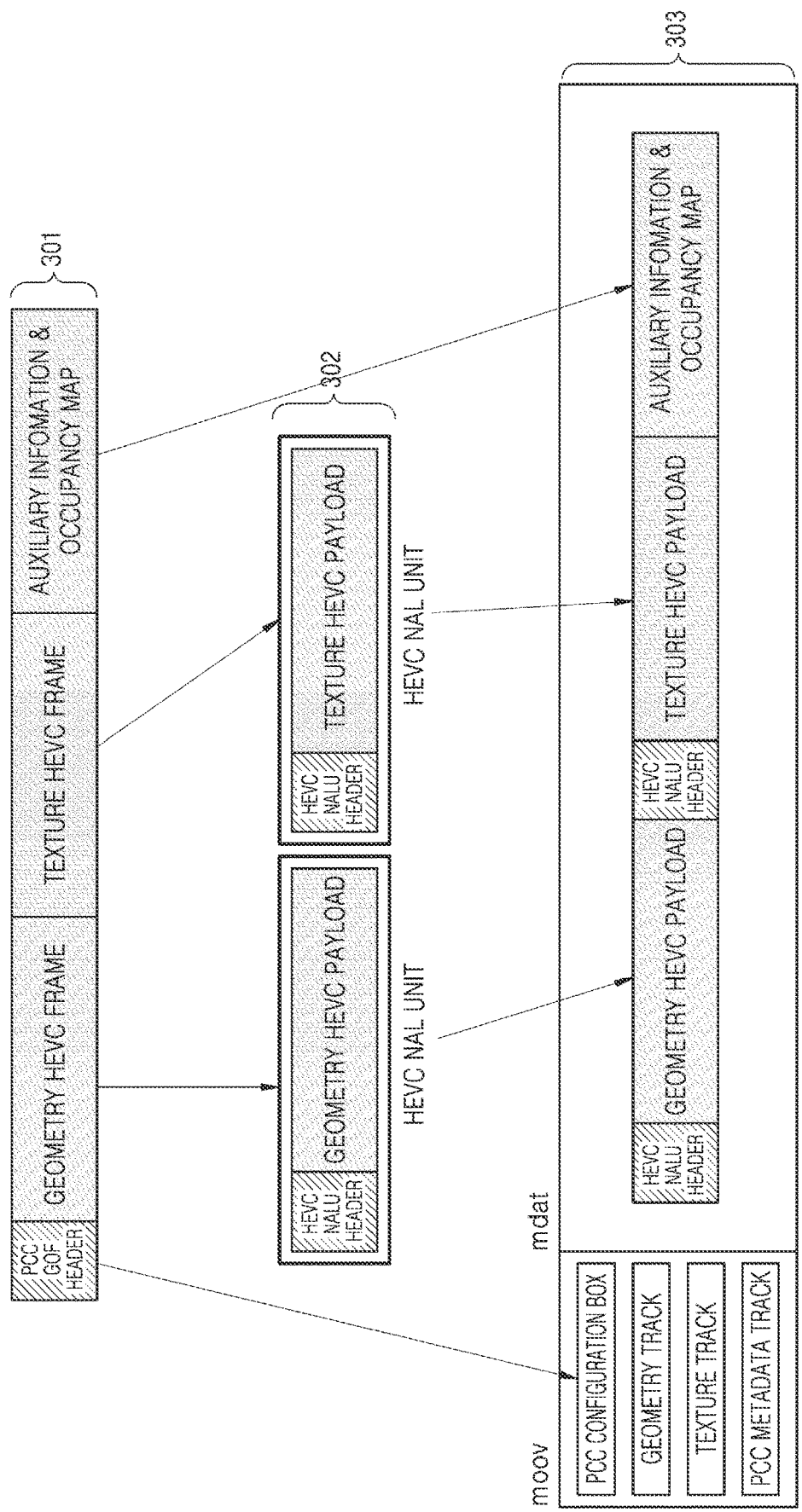
FIG. 3 is a diagram for explaining an example of a method of carrying PCC content in an ISO base media file format (ISOBMFF) media file, according to an embodiment of the present disclosure.

FIG. 3 is a diagram illustrating an example of a method of carrying PCC content in an ISOBMFF media file, according to an embodiment of the present disclosure.

As shown in FIG. 3, PCC content 301 may have a structure including a geometry frame, a texture video frame, and auxiliary information and an occupancy map. The PCC content 301 encoded by using an HEVC scheme may be organized into HEVC NAL units 302. The HEVC NAL units 302 may be packetized into an ISOBMFF file 303. Different component streams of compressed PCC content 301 may be mapped to individual tracks of the ISOBMFF file. For example, as shown in the ISOBMFF file 303 of FIG. 3, logical tracks may be included in a moov box, and actual data compressed according to an HEVC scheme or an arithmetic coding scheme may be included in an mdat box.

Although FIG. 3 illustrates a case where the geometry frame and the texture frame of the PCC content 301 are compressed according to the HEVC scheme, the embodiments of the present disclosure are not limited thereto, and the geometry frame and the texture frame of the PCC content 301 may be compressed according to two-dimensional video codecs of various schemes.

The present disclosure may provide a specific design for storing V-PCC data in the ISOBMFF. The main technical concept of a V-PCC codec design is to reuse an existing video codec to compress main components of PCC data. Therefore, according to various embodiments of the present disclosure, the existing ISOBMFF may be used to store PCC data encoded by using an existing video codec, or PCC data encoded by using a codec to be developed in the future.

According to an embodiment of the present disclosure, additional information about entry points of a file may be provided through a metadata track. Alternatively, a track reference box may refer to a main track and other component tracks.

Therefore, according to various embodiments of the present disclosure, it is possible to support a flexible combination of encoded PCC data at a time of transmission or decoding, which is known as late binding. Although current PCC components mainly use HEVC as a video compression codec, PCC is not limited to using HEVC. The PCC data may be encoded by previously developed video codecs such as AVC, or by video codecs being currently developed such as VVC.

In addition, because commercially available devices may support different combinations of codecs, all PCC data is not necessary to be encoded with the same video codec of the same profile and level. Thus, by using a reference description box for PCC, the design of this suggestion may enable multiple versions of the same PCC data encoded with various video codecs, profiles and levels to be stored, and may enable a combination of them to be selected when transmitting or decoding depending on the capability of a PCC decoder.

Hereinafter, a structure of a PCC file will be described in more detail.

A plurality of independent codecs may be used for compression of PC data, and thus various types of elementary streams may be defined to store PCC content. For example, the PC data may contain a geometry data elementary stream, a texture data elementary stream, an occupancy map data elementary stream, and a metadata elementary stream.

Specifically, the geometry data elementary stream may include geometry of a point cloud compressed by a two-dimensional video codec. The texture data elementary stream may include a texture of the point cloud compressed by the two-dimensional video codec. The occupancy map data elementary stream may include an occupancy map of the point cloud compressed by the two-dimensional video codec.

The metadata elementary stream may include other compressed metadata such as a PCC parameter set and frame auxiliary information. The metadata elementary stream may further include an occupancy map as the other compressed metadata. The metadata elementary stream may also provide a list of other elementary streams including a compressed point cloud stream.

Each of the geometry data elementary stream, the texture data elementary stream, and the occupancy map data elementary stream may conform to the two-dimensional video codec and may be stored in the media file as compliant two-dimensional video media tracks. The metadata elementary stream should provide entry points of a PCC file and should provide references for the geometry data elementary stream, the texture data elementary stream, and the occupancy map data elementary stream.

Samples of the frame auxiliary information, an occupancy map frame, the geometry frame, and the texture frame that constitute a single PC frame should have the same time of decoding. Accordingly, the PCC parameter set used for these samples should have a time of decoding equal to or later than such time of decoding.

The present disclosure suggests various key designs as a harmonious solution for carrying PCC data in the ISOBMFF. Hereinafter, methods for carrying PCC data in the ISOBMFF according to various embodiments of the present disclosure will be described in detail.

According to various embodiments of the present disclosure, an ISOBMFF file containing PCC content may contain at least one of a PCC metadata track, a PCC track reference box, a PCC track grouping type and box (within every PCC component track and metadata track) and/or 'EntityGroupBox' (within 'MetaBox'), auxiliary information, or occupancy map metadata.

The ISOBMFF file containing the PCC content according to an embodiment of the present disclosure may contain a PCC metadata track as an entry point in parsing of the PCC file.

The PCC track reference box according to an embodiment of the present disclosure may provide a list of tracks of PCC components for flexible configuration of the PCC content. However, the embodiments are not limited thereto, and other track reference schemes may be provided. Detailed descriptions will be given below.

According to an embodiment, the PCC track grouping type and box (within every PCC component track and metadata track), and/or 'EntityGroupBox' (within 'MetaBox'), may provide a list of tracks representing different versions of the point cloud stream.

According to an embodiment, the auxiliary information and the occupancy map metadata may be carried together in the PCC metadata track, or may be carried in an auxiliary information timed metadata track and an occupancy map timed metadata track, respectively.

Figure 4:
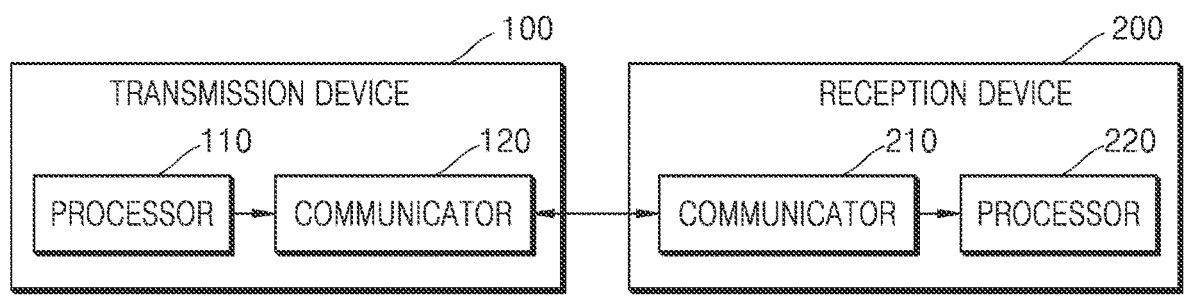
FIG. 4 is a block diagram of a system including a device for compressing and transmitting three-dimensional video content, and a device for receiving and reproducing the compressed three-dimensional video content, according to various embodiments of the present disclosure.

FIG. 4 is a block diagram of a system including a device for compressing and transmitting three-dimensional video content and a device for receiving and reproducing the compressed three-dimensional video content, according to various embodiments of the present disclosure.

As shown in FIG. 4, a transmission device 100 according to an embodiment of the present disclosure may compress three-dimensional video content and transmit the compressed three-dimensional video content to a reception device 200, and the reception device 200 may decompress a received bitstream to reconstruct the three-dimensional video content. For example, the transmission device 100 according to an embodiment of the present disclosure may be a server for providing data or a service related to a three-dimensional image. The reception device 200 according to an embodiment of the present disclosure may include various types of devices capable of receiving and reproducing data related a three-dimensional image. Accordingly, the reception device 200 may be referred to as a reproducing device that reproduces three-dimensional video content.

The transmission device 100 of FIG. 4 may include a processor 110 and a communicator 120, and the reception device 200 may include a communicator 210 and a processor 220. However, not all of the illustrated components are necessary components. The transmission device 100 and the reception device 200 may be implemented by more components than the illustrated components, or may be implemented by fewer components than the illustrated components. For example, the processor 110 and the processor 220 of FIG. 4 may operate to process data related to three-dimensional video content by executing one or more instructions stored in a memory (not shown).

Although FIG. 4 illustrates that the transmission device 100 includes one processor 110 and the reception device 200 includes one processor 220 as well, the transmission device 100 and the reception device 200 may include a plurality of processors. Accordingly, operations and functions performed by the processor 110 and/or the processor 220 described below may be partially performed by the plurality of processors.

The processor 110 of the transmission device 100 according to an embodiment of the present disclosure may generate a media file containing three-dimensional video content. For example, the processor 110 may compress the three-dimensional video content containing point cloud data into a two-dimensional video frame by using a V-PCC technique, and generate an ISOBMFF file from the two-dimensional video frame.

Specifically, the processor 110 according to an embodiment of the present disclosure may generate the two-dimensional video frame in which the three-dimensional video content containing the point cloud data is compressed, and metadata necessary to reconstruct the three-dimensional content from the two-dimensional video frame. The processor 110 may encode the two-dimensional video frame by using a video codec technique. The processor 110 may encapsulate the encoded two-dimensional video frame and the metadata into a media file.

To generate the media file, the processor 110 according to an embodiment of the present disclosure may insert, into a media data box in the media file, a plurality of components included in the two-dimensional video frame in which the three-dimensional video content is compressed. For example, in a case of the media file being an ISOBMFF file, the media data box may be an mdat box.

The processor 110 according to an embodiment of the present disclosure may insert, into a metadata box in the media file, first tracks respectively corresponding to the plurality of components, and a second track containing the metadata. For example, in a case of the media file being an ISOBMFF file, the metadata box may be a moov box.

The processor 110 may insert, into the second track, information about an entry point of each of the plurality of components. Therefore, the second track in the metadata box in the media file may provide the entry point for each of the plurality of components of the two-dimensional video frame when the media file is being parsed.

The processor 110 according to an embodiment of the present disclosure may packetize encapsulated data, and the communicator 120 may transmit a bitstream containing the packetized data to the reception device 200.

The communicator 210 of the reception device 200 according to an embodiment of the present disclosure may receive, from the transmission device 100, the packetized data contained in the bitstream.

The processor 220 according to an embodiment of the present disclosure may reconstruct the media file by processing the packetized data. The processor 220 may obtain the encoded two-dimensional video frame and the metadata by parsing the media file.

The processor 220 according to an embodiment of the present disclosure may identify the media data box and the metadata box contained in the media file. First, the processor 220 may identify, from the metadata box, the first tracks respectively corresponding to the plurality of components contained in the encoded two-dimensional video frame, and the second track containing the metadata. The processor 220 may identify the entry point for each of the plurality of components in the media data box from the second track. Accordingly, the processor 220 may obtain the encoded two-dimensional video frame and the metadata from the media file based on the identified entry points.

The processor 220 may decode the encoded two-dimensional video frame and reconstruct and output the three-dimensional video content based on the two-dimensional video frame and the metadata. For example, the processor 220 may extract V-PCC content from an ISOBMFF file and reconstruct three-dimensional video content. The V-PCC content may include a two-dimensional video frame containing a geometry image indicating position information of points included in a point cloud, a texture image indicating color information of the points, and an occupancy map image indicating information about pixels having information about the point cloud from among pixels of the two-dimensional image included in the two-dimensional video frame. The V-PCC content may further include metadata containing auxiliary information including information about patches obtained from the point cloud.

The media file according to various embodiments of the present disclosure may include at least one box. The box may be a data block or an object containing media data or metadata related to the media data. The boxes may constitute a hierarchical structure, and data may be classified according to the hierarchical structure, and thus, the media file may have a form suitable for storage and transmission of a large amount of media data. In addition, the media file may have a structure that enables a user to easily access media information, for example, to skip to a specific point of media content to be reproduced.

According to an embodiment of the present disclosure, the transmission device 100 may generate and transmit an ISOBMFF file containing the V-PCC content. Hereinafter, an example in which point cloud data is stored in an ISOBMFF media file according to an embodiment of the present disclosure will be described with reference to FIG. 5.

According to an embodiment of the present disclosure, in a case of the media file being an ISOBMFF file 501, the media file may contain an ftyp box (not shown), a moov box 502, and an mdat box 503. The ftyp box (file type box) may provide a file type or compatibility-related information for the corresponding media file. The moov box 502 (movie box) may be a box containing metadata about media data of the corresponding media file. The moov box may serve as a container for all pieces of metadata.

The mdat box (media data box) 503 may be a box for containing actual pieces of media data of the corresponding media file. The media data may contain audio samples and/or video samples, and the mdat box may serve as a container for containing the media samples.

The transmission device 100 according to an embodiment of the present disclosure may carry a plurality of V-PCC components in a plurality of tracks, respectively, for carrying the V-PCC content in the ISOBMFF.

When mapping compressed V-PCC component streams to each of the tracks, a logical track may be contained in the moov box 502, and actual compressed data may be contained in the mdat box 503 in the form of samples.

The V-PCC content may contain a geometry data elementary stream, a texture data elementary stream, an occupancy map data elementary stream, and a metadata elementary stream.

Each of the geometry data elementary stream, the texture data elementary stream, and the occupancy map data elementary stream may conform to the two-dimensional video codec and may be stored in the media file as compliant two-dimensional video media tracks. The metadata elementary stream should provide entry points of a PCC file and may also have to provide references for the geometry data elementary stream, the texture data elementary stream, and the occupancy map data elementary stream.

Samples of the frame auxiliary information, the occupancy map frame, the geometry frame, and the texture frame that constitute a single PC frame should have the same time of decoding. Accordingly, the PCC parameter set used for these samples should have a time of decoding equal to or later than such time of decoding.

Figure 5:
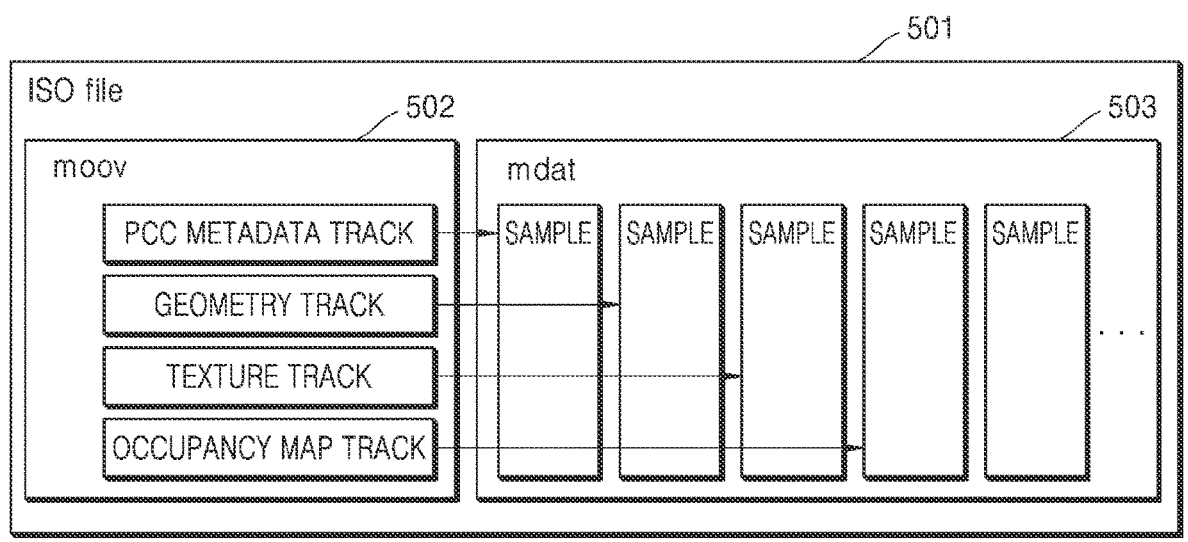
FIG. 5 illustrates an example in which point cloud data is stored in an ISOBMFF media file, according to an embodiment of the present disclosure.

As shown in FIG. 5, the geometry data elementary stream, the texture data elementary stream, and the occupancy map data elementary stream may be stored as a geometry track, a texture track, and an occupancy map track, respectively.

The transmission device 100 according to an embodiment of the present disclosure may further include a PCC metadata track in the moov box 502. The PCC metadata track may provide an entry point of a PCC stream when a reception entity parses the PCC file. The PCC file may contain a plurality of PCC streams, and a plurality of PCC metadata tracks corresponding to the plurality of PCC streams. Here, an entry point of each of the PCC streams may be indicated by the PCC metadata track.

The PCC metadata track according to an embodiment of the present disclosure may contain at least one of a PCC configuration record, a PCC track reference box, or a track grouping box.

The PCC configuration record may indicate a profile and a level of a PCC decoder needed to decode components described by the PCC configuration record.

The PCC track reference box may provide a list of PCC component tracks along with track-related information such as a used video codec, a profile, a level, and a type of a component represented by a track.

The track grouping box may provide a list of tracks indicating different versions of the point cloud stream. In addition, the track grouping box may be an entry point of the corresponding PCC file/stream.

Hereinafter, three embodiments related to a track design for a PCC stream will be described.

First, as an embodiment related to the track design for a PCC stream, the transmission device 100 may generate a media file containing a PCC track reference box. The PCC track reference box may provide a list of PCC component tracks for flexible configuration of the PCC content. The PCC track reference box may serve as an entry point that contains pieces of track reference information indicating component data types, a codec, a profile, and a level.

Table 1 below shows the definition of the PCC track reference box.

TABLE 1

| Box Type: | 'pctr' |
|---|---|
| Container: | TrackBox |
| Mandatory: | Yes |
| Quantity: | One |

According to Table 1, a box type of the PCC track reference box is 'pctr' and is contained in a trak box of the moov box.

The PCC track reference box may provide a list of tracks containing geometry data, texture data, and occupancy map data. For the flexible configuration of PCC content that supports capability of various clients, data encoded by using various video codecs, profiles and levels, and a plurality of versions of stream type representations (e.g., whether both d0 and d1 frames are contained or only one frame type is contained in a stream), and lossless encoding may be supported.

Table 2 below shows syntax of the PCC track reference box.

TABLE 2

```
aligned(8) class PCCTrackReferenceBox( ) extends Box ('pctr') {
    unsigned int(8) numOfDataTrackReferences;
    for (i=0; i< numOfDataTrackReferences; i++) {
        unsigned int(4) DataType;
        unsigned int(4) VideoCodecType;
        unsigned int(8) VideoProfileIndication;
        unsigned int (8) VideoLevelIndication;
        unsigned int(1) lossless;
        bit(7)reserved = 0;
        unsigned int(32) track_ID;
    }
}
```

In the syntax of Table 2, numOfDataTrackReferences indicates the number of track references referenced in the box.

DataType indicates a type of the PCC data in a referenced track, from among types listed in Table 3 below.

TABLE 3

| value | PCC Data Type |
|---|---|
| 0x00 | reserved for ISO use |
| 0x01 | geometry d0 video stream |
| 0x02 | geometry d1 video stream |
| 0x03 | texture video stream |
| 0x04 | occupancy map video stream |
| 0x05~0x0E | reserved for ISO use |

VideoCodecType indicates a type of a video coding specification that is from among specifications listed in Table 4 below, and is used for encoding the PCC data in the referenced track.

VideoProfileIndication contains profile_idc of the video coding specification that is from among the specifications listed in Table 4 below, and is used for encoding the PCC data in the referenced track.

VideoLevelIndication contains level_idc of the video coding specification that is from among the specifications listed in Table 4 below, and is used for encoding the PCC data in the referenced track.

TABLE 4

| value | video coding specification | sample entry names |
|---|---|---|
| 0x00 | reserved for ISO use | |
| 0x01 | ISO/IEC 23008-2 | hevc, hev1, ... |
| 0x02 | ISO/IEC 14496-10 | avc1, avc2, ... |
| 0x03 | ISO/IEC 23090-2 | |
| 0x04~0x0E | reserved for ISO use | | lossless indicates whether lossless encoding is performed on the PCC data in the referenced track.

track_ID indicates a track identifier of the referenced track. track_ID should have a value other than 0, and a given value should be unique within this box.

Meanwhile, as another embodiment related to the track design for a PCC stream, an existing track reference tool and scheme types of the ISOBMFF may be used.

However, in a case of using the existing track reference tool and the scheme types of the ISOBMFF, a client should parse each track so as to identify each component.

To link a point cloud metadata track to component video tracks, the track reference tool of the ISOBMFF standard may be used. A content description reference 'cdsc' from the PCC metadata track to the component tracks may be generated. To this end, TrackReferenceBox should be added to TrackBox, and TrackReferenceTypeBox of a type 'cdsc' should be arranged in TrackReferenceBox. TrackReferenceTypeBox may contain a track_ID array that specifies the component video tracks referenced by the PCC metadata track. Alternatively, a new track reference type for a PCC bitstream may be defined and used instead of 'cdsc'. Alternatively, the media file may contain a chain of track references, which may be implemented by adding a 'cdsc' track reference from the PCC metadata track to geometry video track(s) and adding 'auxl' track references from these tracks to the occupancy map and texture tracks.

A type of each track is known as a track scheme type. In a case of a geometry video stream track, a scheme_type field of SchemeTypeBox may be configured to be 'pcgm' to indicate a point cloud geometry restricted scheme. In a case of a texture video stream track, the scheme_type field may be configured to be 'pctx' to indicate a point cloud texture restriction scheme.

Meanwhile, as another embodiment related to the track design for a PCC stream, an EntityToGroupBox-based track design of a MetaBox of the ISOBMFF may be used.

A V-PCC bitstream is a collection of independently decodable video streams (geometry, texture, and occupancy maps) corresponding to relevant times, and static metadata. The ISOBMFF is providing a proven structure for encoding and encapsulating a collection of such streams. The track structure of the ISOBMFF is suitable for timed streams (video and timed metadata). A sample item, sample group, or track-level metadata box is suitable for static metadata. In this embodiment, a track level design is suggested.

Given that V-PCC requires four time-aligned data streams (texture, geometry, an occupancy map and metadata), a design with four independent tracks may be suitable. Synchronization between the streams may be processed by ISOBMFF track timing structures (stts, ctts and cslg, or equivalent mechanisms within movie fragments).

Tracks of a single V-PCC file may be grouped by using a file-level EntityToGroupBox with a V-PCC-specific grouping four-character code (4CC) value (e.g., 'vpcg' for a visual point cloud group). All pieces of metadata common to a single V-PCC stream may be specified within this V-PCC-specific EntityToGroupBox. EntityToGroupBox may serve as an entry point for accessing the V-PCC content.

Carriage of encoded video tracks using an MPEG-specific codec is well defined in specifications derived from the ISOBMFF. For example, carriage of AVC- or HEVC-encoded videos is defined in ISO/IEC 14496-15. For those in need of different codec types, the ISOBMFF also provides an extension mechanism. (See Annex C of ISO/IEC 14496-15).

In a reproduction entity, it is meaningless to display texture, geometry, or occupancy map tracks without reconstructing the point cloud, and thus restricted video scheme types 'pcct', 'pccg', and 'pcco' may be specified and used for the PCC tracks, respectively.

V-PCC metadata may be contained in a timed metadata track. Carriage of timed metadata may be processed in a manner that is the same as or similar to that used for carriage of video tracks. A V-PCC-specific sample entry type of a timed metadata track 'vpcm' may be specified.

In general, metadata required for a V-PCC solution may be classified into a stream level, a group-of-frame (GOF) level, or information available per frame. Therefore, the following ISOBMFF structure may be suggested. It is assumed that a V-PCC coding specification defines a data structure described below.

As an example, stream-level metadata should be used globally and should not change over time due to its static characteristics. Accordingly, the stream-level metadata may be stored in a V-PCC-specific EntityToGroupBox 'vpcg' contained in a file-level MetaBox.

Table 5 below is syntax of the stream-level metadata stored in the V-PCC specific EntityToGroupBox 'vpcg'.

TABLE 5 aligned (8) class VPCCGroupBox( ) extends EntityToGroupBox ('vpcg', version, flags) {
  vpcc_bitstream_metadata{ }
} vpcc_bitstream_metadata( ) may be specified within the V-PCC coding specification.

As another example, group-of-frame (GOF)-level metadata may be modifiable between groups of frames, and may be indexable for random access. Accordingly, the GOF-level metadata may be stored in SampleGroupDescriptionBox of the 'vpcm' track. SampleGroupDescriptionEntry may be extended to be matched to a new V-PCC-specific box, VPCCSampleGroupEntry 'vpcs'.

Table 6 below is syntax of the GOF-level metadata stored in a SampleGroupDescriptionBox of the 'vpcm' track.

TABLE 6 aligned(8) class VPCCSampleGroupEntry( ) extends SampleGroupDescriptionEntry ('vpcs')
{
  vpcc_gof_metadata{ }
} vpcc_gof_metadata( ) may be specified within the V-PCC coding specification.

As another example, the frame-level metadata may be modifiable in every frame, and may be stored in the timed metadata track 'vpcm'.

Table 7 below is syntax of the frame-level metadata stored in the timed metadata track 'vpcm'.

TABLE 7 sample {
  vpcc_frame_metadata { }
} vpcc_frame_metadata( ) may be specified within the V-PCC coding specification.

The PCC metadata track according to an embodiment of the present disclosure may contain a PCC decoder configuration record.

The PCC decoder configuration record may provide indication of a profile and a level of the PCC decoder needed to decode the elementary streams described by the PCC decoder configuration record. The PCC decoder that conforms to the indicated profile and level should be able to decode all elementary streams of a file regardless of a video profile and a level that each elementary stream conforms to.

The PCC decoder configuration record may provide indication of a version. Version 1 of the PCC decoder configuration record is used in the present disclosure. A new value of this field should be used for a modification that is undecodable by a decoder that conforms to the version 1.

Table 8 below is syntax of the PCC decoder configuration record.

TABLE 8

```
aligned(8) class PCCDecoderConfigurationRecord {
    unsigned int(8) configurationVersion = 1;
    unsigned int(8) PCCProfileIndication;
    unsigned int(8) PCCLevelIndication;
}
``` configurationVersion indicates a version of this record.

PCCProfileIndication contains profile_idc of a PCC standard.

PCCLevelIndication contains level_idc of a PCC standard.

Meanwhile, the PCC metadata track according to an embodiment of the present disclosure may contain a PCC parameter set.

The PCC parameter set may provide initialization information for the PCC decoder.

Table 9 below is syntax of the PCC parameter set.

TABLE 9

```
aligned(8) class PCCParameterSets {
    unsigned int(8) PCCParameterSetVersion = 1;
    unsigned int(16) frame_width.;
    unsigned int(16) frame_height;
    unsigned int(8) occupancy_resolution;
    unsigned int(8) radius_to_smoothing;
    unsigned int(8) neighbor_count_smoothing;
    unsigned int(8) radius2_boundary_detection;
    unsigned int(8) threshold_smoothing;
    unsigned int(8) lossless_geometry;
    unsigned int(8) lossless_texture;
    unsigned int(8) no_attributes;
    unsigned int(8) lossless_geometry_444;
    unsigned int(8) absolute_d1_coding;
    unsigned int(8) binary_arithmetic_coding;
}
```

Definitions of elements of the syntax of Table 9 is the same as those defined in the PCC standard, and thus will be omitted in the present disclosure.

PCC data compressed by the video coding specification should be stored in a track that has a sample entry which is one of 4CCs listed in the same row of the table.

Hereinafter, the timed metadata track of the PCC metadata track will be described.

Table 10 below shows the definition of the timed metadata track of the PCC metadata track.

TABLE 10

Sample Entry Type: 'pcc1'
Container: Sample Description Box ('stsd')
Mandatory: No
Quantity: 0 or 1

The timed metadata track of the PCC metadata track may be contained in a stsd box (sample description box) of the PCC metadata track. The stsd box may be contained in a stbl box (sample table box), the stbl box may be contained in a minf box (media information box), and the minf box may be contained in an mdia box (media box) of the PCC metadata track.

A track sample entry type 'pcc1' may be used as a sample entry type of the timed metadata track. A sample entry of this sample entry type may be specified by Table 11 below.

TABLE 11

```
aligned(8) class PCCMetadataSampleEntry( ) extends
MetadataSampleEntry ('pcc1') {
    PCCDecoderConfigureationRecord ( );
    PCCParameterSets ( );
}
```

The PCC metadata track may contain, in the sample entry, static configuration parameters (which do not change over time), and may contain, in a sample format, dynamic auxiliary information or dynamic patch information which changes depending on a frame.

Each sample of the PCC metadata track may generate one point cloud instance (point cloud "frame"). Times of decoding of various components (auxiliary information, an occupancy map, geometry, and texture) of one point cloud instance are the same as a time of decoding (defined as a sample box 'stts' by using the time of decoding) of a PCC metadata sample. Accordingly, all samples of other tracks referenced by the PCC metadata sample should have the same decoding timestamp.

Each sample may contain both the auxiliary information and the occupancy map data, or contain only the auxiliary information, depending on whether an occupancy map data stream compressed by a separate two-dimensional video codec is present.

Sample syntax of the sample entry type 'pcc1' may be specified by Table 12 below.

TABLE 12

```
aligned(8) PCCMetadataSample( ) {
    AuxiliaryInfoBox( );
    OccupancyMapBox( ); // optional
}
aligned(8) class AuxiliaryInfoBox extends FullBox('auxi') {
    unsigned int(8) CodecType;
    unsigned int (32) patch_count;
    unsigned int (32) block_count;
    unsigned int(8) occupancy_precision;
    unsigned int(8) max_candidate_count;
    unsigned int(8) bit_count_u0;
    unsigned int(8) bit_count_v0.
    unsigned int(8) bit_count_u1;
    unsigned int(8) bit_count_v1;
    unsigned int(8) bit_count_d1;
    unsigned int(32) occupancy_aux_stream_size;
    for (i=0; i< patch_count; i++) {
        PatchAuxInfoStruct( ); // specified in V-PCC WD
    }
    for (i=0; i< block_count; i++) {
        BlockAuxIntoStruct( ); // specified in V-PCC WD
    }
}
aligned(8) class OccupancyMapBox extends FullBox('occm') {
    unsigned int(8) CodecType;
    BlockOccupancyMapStruct; // specified in V-PCC WD
}
```

In the syntax of Table 12, CodecType indicates a coding specification type used to encode the PCC metadata (auxiliary information, an occupancy map) carried in a corresponding box.

PatchAuxInfoStruct( ) contains syntax elements that are specified once per patch within the V-PCC standard.

BlockAuxInfoStruct( ) contains syntax elements that are specified once per block within the V-PCC standard.

BlockOccupancyMapStruct( ) contains syntax elements that are specified for non-empty blocks within the V-PCC standard.

Definitions of other elements of the syntax are the same as those defined in the PCC specification, and thus will be omitted in the present disclosure.

Although Table 12 illustrates that the auxiliary information is contained in the PCC metadata track, and an occupancy map is optionally contained in the PCC metadata track, the embodiments of the present disclosure are not limited to Table 12. When the transmission device 100 according to another embodiment of the present disclosure generates a new metadata sample entry for each timed metadata component by using a separate auxiliary information metadata track and a separate occupancy map metadata track, only configuration information and parameter set information may be contained in the "PCC metadata track".

Hereinafter, an occupancy map and auxiliary information track will be described.

A decoder may reconstruct the point cloud, based on a geometry stream, by using the occupancy map and the auxiliary information that are part of other streams within each GOF unit. Accordingly, this stream may be arranged on a separate timed metadata track, which may be referred to as an occupancy map track. This track may be identified by a next sample entry within a sample descriptor of the track. Samples for the track may contain not only the auxiliary information of a single frame but also the occupancy map.

Table 13 below shows syntax of a sample entry with respect to a predefined metadata sample entry.

TABLE 13 aligned (8) class PCCOccupancyMapSampleEntry extends MetaDataSampleEntry('pcom') {
}

According to another embodiment of the present disclosure, two separate timed metadata tracks may be used to carry the occupancy map information and the auxiliary information. The occupancy map track should contain the same sample entry as described above for a case of a single combined occupancy map and auxiliary information track. The timed metadata track for the auxiliary information should contain a sample entry shown in Table 14 below, in a sample descriptor of the corresponding metadata track.

TABLE 14 aligned(8) class PCCAuxInfoSampleEntry extends MetaDataSampleEntry ('pcax') {
}

In a case where the occupancy map is coded by using a video coder, a generated video stream may be arranged on a restricted video scheme track. A scheme_type field of SchemeTypeBox of this track may be configured to be 'pomv', which indicates a restricted video scheme of the occupancy map of the point cloud. This video track may be referenced by the PCC track reference box (or within other embodiments related to the track reference described above).

Hereinafter, grouping of a plurality of versions of point cloud streams will be described.

An ISOBMFF container may contain a plurality of point cloud streams.

These multi-point cloud streams may be different versions of the same point cloud stream (representing the same object) or may be a plurality of point cloud streams different from each other (representing different objects).

By adding TrackGroupBox to TrackBox within all tracks (components) of the PCC stream (including a compressed video and metadata stream), predefined versions of the point cloud stream represented by a set of tracks may be identified by using a track grouping tool in the ISOBMFF.

Syntax shown in Table 15 below defines a new track grouping type PCCStreamGroupBox.

TABLE 15 aligned(8) class PCCStreamGroupBox extends TrackGroupTypeBox ('pccs') {
}

Tracks belonging to the same PCC stream have the same track_group_id value for track_group_type 'pccs', and track_group_id of one PCC stream is different from track_group_id of other PCC streams. Accordingly, track_group_id within TrackGroupTypeBox having track_group_type 'pccs' may be used as an identifier of the PCC stream.

In a case where a plurality of point cloud streams representing different point clouds (objects) are allowed in a single container, at least one unique PCC metadata track may exist for each point cloud stream (of other objects).

As described above, according to various embodiments of the present disclosure, a method of carrying V-PCC content in an ISOBMFF file by carrying a plurality of V-PCC components in a plurality of tracks is suggested. Each track may be an individual elementary stream of the PCC stream, and the individual elementary stream may be decoded by a decoder corresponding to the individual elementary stream.

The PCC metadata track according to an embodiment of the present disclosure may contain a list of other tracks, and a list of all content-related tracks may indicate an entry point of the corresponding content. Therefore, according to various embodiments of the present disclosure, the entry point that enables the flexible configuration of the V-PCC content by using the PCC metadata track may be defined in a media file.

Furthermore, according to various embodiments of the present disclosure, by defining a new V-PCC metadata sample format containing data related to V-PCC data, duplicate heads in an mdat box in an ISOBMFF file may be removed.

Furthermore, according to various embodiments of the present disclosure, the encoded PCC data may be flexibly combined at a time of transmission or decoding. In addition, content that may be encoded and decoded by using various video codecs, profiles, and levels may be provided, and grouping for a plurality of versions of point cloud streams may be realized.

Figure 6:
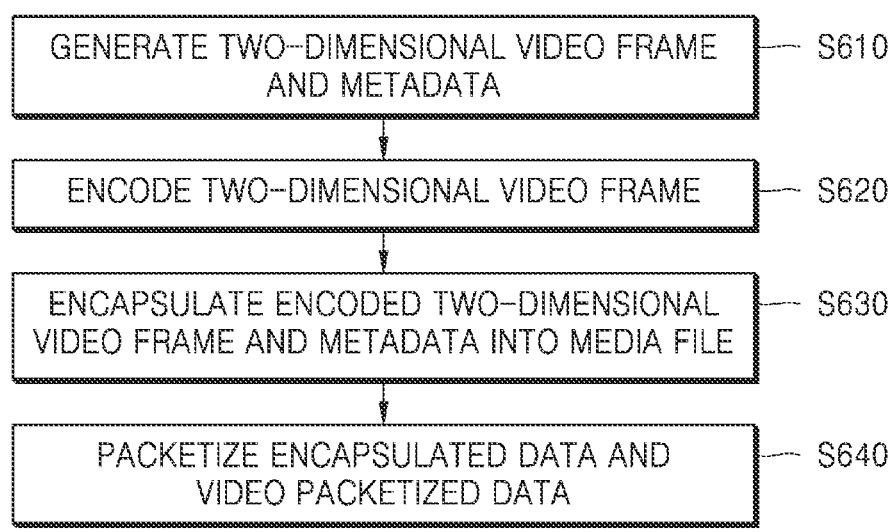
FIG. 6 is a flowchart of a method of transmitting three-dimensional video content by a transmission device, according to an embodiment of the present disclosure.

Hereinafter, a method of transmitting three-dimensional video content by the transmission device 100 according to various embodiments of the present disclosure will be described with reference to the flowchart shown in FIG. 6. The method described below may be performed by the configuration of the transmission device 100 shown in FIG. 4.

In operation S610, the transmission device 100 according to an embodiment of the present disclosure may generate a two-dimensional video frame in which three-dimensional video content containing point cloud data is compressed, and metadata necessary to reconstruct three-dimensional content from the two-dimensional video frame.

The transmission device 100 according to an embodiment of the present disclosure may generate at least one two-dimensional image by projecting, onto a two-dimensional plane, a point cloud frame included in the three-dimensional video content. For example, the transmission device 100 generates at least one geometry image, at least one texture image, and an occupancy map image. The transmission device 100 may generate the two-dimensional video frame from the generated two-dimensional images.

The transmission device 100 according to an embodiment of the present disclosure may generate metadata necessary to reconstruct the three-dimensional content from the two-dimensional video frame. The transmission device 100 may generate, as the metadata, auxiliary information containing information related to patches.

In operation S620, the transmission device 100 according to an embodiment of the present disclosure may encode the two-dimensional video frame. The transmission device 100 may encode the two-dimensional video frame by using a video codec. The transmission device 100 may selectively encode the metadata.

In operation S630, the transmission device 100 according to an embodiment of the present disclosure may encapsulate the encoded two-dimensional video frame and the metadata into a media file. For example, the transmission device 100 may encapsulate the encoded two-dimensional video frame and the metadata into an ISOBMFF media file.

The transmission device 100 according to an embodiment of the present disclosure may insert, into a media data box in the media file, a plurality of components contained in the encoded two-dimensional video frame. The plurality of components contained in the encoded two-dimensional video frame may include at least one of geometry data, texture data, or occupancy map data. For example, the transmission device 100 may insert the geometry data, the texture data, and the occupancy map data, into samples in an mdat box of the ISOBMFF file.

The transmission device 100 according to an embodiment of the present disclosure may insert, into a metadata box in the media file, first tracks respectively corresponding to the plurality of components, and a second track containing the metadata. For example, the transmission device 100 may insert a video track corresponding to the geometry data, a video track corresponding to the texture data, and a video track corresponding to the occupancy map data, into a moov box in the ISOBMFF file. The transmission device 100 may insert the second track corresponding to the metadata, into a moov box in the ISOBMFF file. The second track may be the PCC metadata track described above. A repetitive description is omitted.

The second track according to an embodiment of the present disclosure may provide the entry point for each of the plurality of components of the PCC content, when the reception device 200 parses the media file. The second track according to an embodiment of the present disclosure may provide a list of the first tracks. Accordingly, the reception device 200 may rapidly obtain information about the first tracks, based on information provided by the second track, without parsing the first tracks.

A method of generating a media file will be described in more detail with reference to FIG. 7.

In operation S640, the transmission device 100 according to an embodiment of the present disclosure may packetize encapsulated data and transmit the packetized data to the reception device 200. For example, the transmission device 100 may generate a bitstream having a form suitable for an MMT scheme, and transmit a packetized media data.

Figure 7:
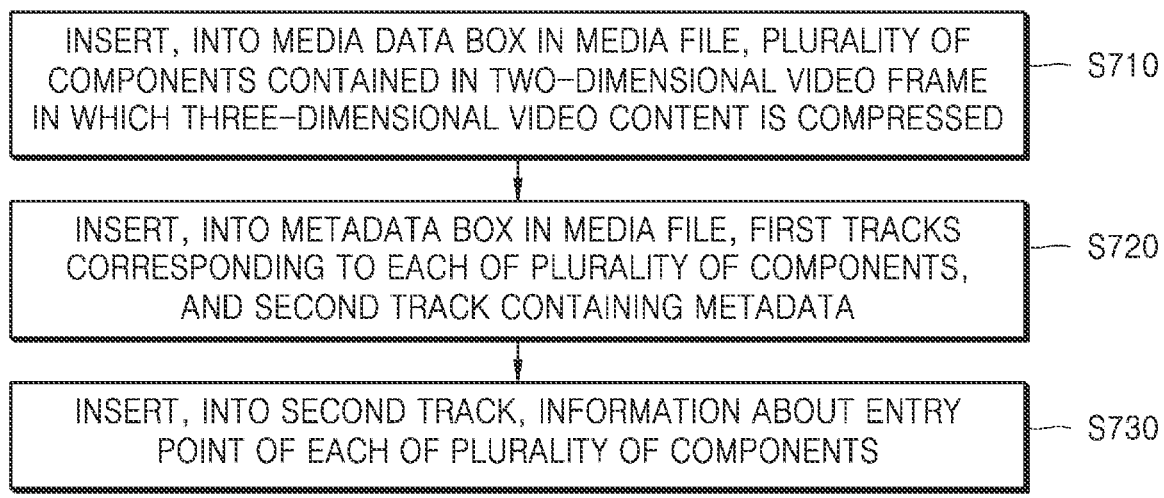
FIG. 7 is a flowchart of a method of generating, by a transmission device, a media file containing three-dimensional video content, according to an embodiment of the present disclosure.

FIG. 7 is a flowchart of a method of generating, by the transmission device 100, a media file containing three-dimensional video content, according to an embodiment of the present disclosure.

In operation S710, the transmission device 100 according to an embodiment of the present disclosure may insert, into the media data box in the media file, the plurality of components contained in the two-dimensional video frame in which the three-dimensional video content is compressed.

The media file according to an embodiment of the present disclosure may be a file that conforms to the ISOBMFF, and the media data box may be an mdat box.

The three-dimensional video content according to an embodiment of the present disclosure may contain a point cloud, and may be compressed into two-dimensional video frames by V-PCC technology. The two-dimensional video frame may contain at least one of the geometry image indicating the position information of the points included in the point cloud, the texture image indicating the color information of the points, or the occupancy map image indicating the information about pixels having information about the point cloud from among pixels of the two-dimensional image included in the two-dimensional video frame.

The metadata may contain the auxiliary information including information about the patches obtained from the point cloud.

In operation S720, the transmission device 100 according to an embodiment of the present disclosure may insert, into the metadata box in the media file, the first tracks respectively corresponding to the plurality of components, and the second track containing the metadata.

The plurality of components of the compressed three-dimensional video content may be mapped to tracks in the metadata box. The metadata box of the media file according to an embodiment of the present disclosure may be the moov box in the ISOBMFF file.

The first tracks according to an embodiment of the present disclosure may contain at least one of a geometry track containing information about an encoded geometry image, a texture track containing information about an encoded texture image, or an occupancy map track containing information about an encoded occupancy map image.

In operation S730, the transmission device 100 according to an embodiment of the present disclosure may insert, into the second track, information about an entry point of each of the plurality of components.

The second track according to an embodiment of the present disclosure may be the entry point for each of the plurality of components by further containing the list of the first tracks.

The second track according to an embodiment of the present disclosure may contain at least one of the number of the first tracks referenced in the second track, data types of the first tracks, a type, a profile, and a level of a video coding specification used to encode data of the first tracks, whether the data of the first tracks is losslessly encoded, or track identifiers of the first tracks.

For example, in a case of the second track being the PCC metadata track of the ISOBMFF file, the second track may contain the PCC track reference box of Table 2.

Furthermore, the second track according to an embodiment of the present disclosure may further contain at least one of the PCC decoder configuration record, or the PCC parameter set. For example, in a case of the second track being the PCC metadata track of the ISOBMFF file, at least one of the PCC decoder configuration record, or the PCC parameter set may be contained in a sample entry of a sample descriptor box of the second track.

Each of tracks contained in the metadata box may contain identification information for identifying a group including each track. For example, in a case of the media file being an ISOBMFF file, the transmission device 100 may add TrackGroupBox to TrackBox of all tracks of the PCC stream, and assign the same track group identifier to tracks belonging to the same PCC stream.

Figure 8:
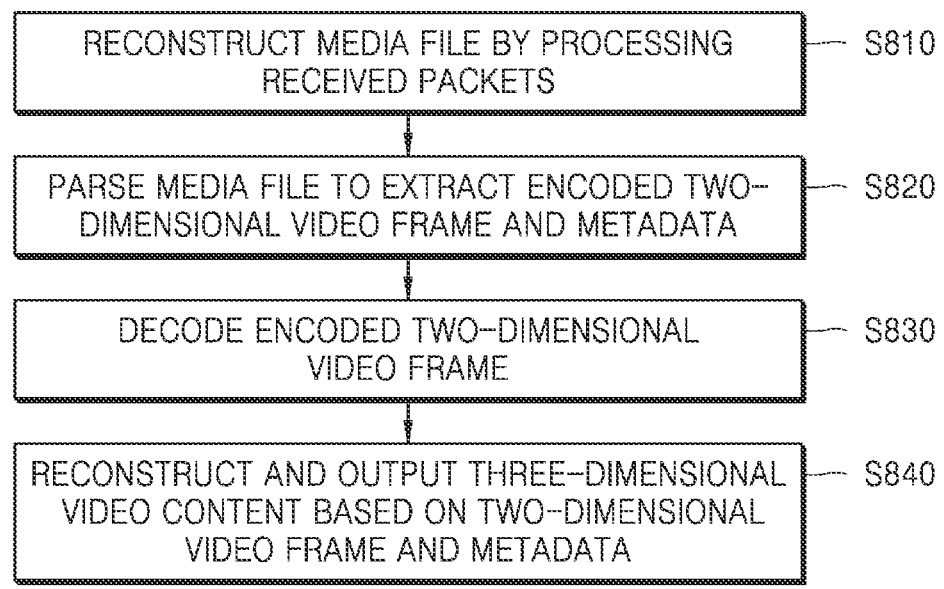
FIG. 8 is a flowchart of a method of reproducing three-dimensional video content by a reception device, according to an embodiment of the present disclosure.

Hereinafter, a method of receiving and reconstructing three-dimensional video content by the reception device 200 according to various embodiments of the present disclosure will be described with reference to the flowchart shown in FIG. 8. The method described below may be performed by the configuration of the reception device 200 shown in FIG. 4.

In operation S810, the reception device 200 according to an embodiment of the present disclosure may reconstruct the media file by processing packets contained in the bitstream received from the transmission device 100.

In operation S820, the reception device 200 according to an embodiment of the present disclosure may parse the media file to extract the encoded two-dimensional video frame and the metadata from the media file.

The two-dimensional video frame according to an embodiment of the present disclosure may be data obtained by compressing the three-dimensional video content containing the point cloud by using V-PCC technology. The two-dimensional video frame may contain at least one of the geometry image, the texture image, or the occupancy map image, and the metadata may contain the auxiliary information including information about the patches obtained from the point cloud.

The reception device 200 according to an embodiment of the present disclosure may identify the media data box and the metadata box contained in the media file so as to parse the media file. For example, the media file may be an ISOBMFF file, the media data box may be an mdat box, and the metadata box may be a moov box.

The reception device 200 according to an embodiment of the present disclosure may identify, from the metadata box, the first tracks respectively corresponding to the plurality of components contained in the encoded two-dimensional video frame, and the second track containing the metadata.

For example, the first tracks may contain at least one of the geometry track, the texture track, or the occupancy map track. The second track containing the metadata may further include the list of the first tracks.

The reception device 200 according to an embodiment of the present disclosure may identify, from the second track, the entry point for each of the plurality of components in the media data box.

The second track according to an embodiment of the present disclosure may contain at least one of the number of the first tracks referenced in the second track, the data types of the first tracks, the type, the profile, and the level of the video coding specification used to encode the data of the first tracks, whether the data of the first tracks is losslessly encoded, or the track identifiers of the first tracks. For example, in a case of the second track being the PCC metadata track of the ISOBMFF file, the second track may contain the PCC track reference box of Table 2.

The reception device 200 according to an embodiment of the present disclosure may extract the encoded two-dimensional video frame and the metadata from the media file based on the identified entry points.

In operation S830, the reception device 200 according to an embodiment of the present disclosure may decode the encoded two-dimensional video frame.

The reception device 200 may decode the encoded two-dimensional video frame by using the video codec that has been used by the transmission device 100.

The second track according to an embodiment of the present disclosure may further contain at least one of the PCC decoder configuration record or the PCC parameter set. For example, in a case of the second track being the PCC metadata track of the ISOBMFF file, at least one of the PCC decoder configuration record, or the PCC parameter set may be contained in the sample entry of the sample descriptor box of the second track.

Each component constituting the PCC data may be encoded by an independent video codec and transmitted. Accordingly, the reception device 200 according to an embodiment of the present disclosure may decode the two-dimensional video frame based on a suitable video codec, profile, and level, based on the PCC track reference box of the PCC metadata track.

In operation S840, the reception device 200 according to an embodiment of the present disclosure may reconstruct and output the three-dimensional video content based on the two-dimensional video frame and the metadata.

The media file according to an embodiment of the present disclosure may contain a plurality of point cloud streams. The reception device 200 according to an embodiment of the present disclosure may reconstruct the point cloud from data of tracks included in the same group by identifying an identifier of a group including the data of each track, from the tracks in the metadata box of the media file.

The above embodiments may be implemented as a computer-executable program and may be implemented in a general-purpose digital computer that executes the program using a computer-readable recording medium. Also, the data structure used in the above embodiments may be written on the computer-readable recording medium through various means. Also, the above embodiments may be implemented in the form of a computer-readable recording medium including computer-executable instructions, such as program modules executable by computers. For example, the methods implemented by software modules or algorithms may be stored as computer-readable and computer-executable codes or program commands on the computer-readable recording medium.

The computer-readable recording medium may be any available medium accessible by computers and may include volatile or non-volatile medium and detachable and non-detachable medium. The computer-readable recording medium may include, but is not limited to, magnetic storage mediums such as ROMs, floppy disks, or hard disks and optical storage mediums such as CD-ROMs or DVDs. Also, the computer-readable recording medium may include a computer storage medium and a communication medium.

Also, a plurality of computer-readable recording media may be distributed in computer systems connected over a network, and data stored in the distributed recording media, for example, program instructions and code, may be executed by at least one computer.

Particular implementations described herein are merely embodiments of the present disclosure and do not limit the scope of the present disclosure in any way. For the sake of conciseness, descriptions of related art electronic configurations, control systems, software, and other functional aspects of the systems may be omitted.

The invention claimed is:

1. A method of generating a media file containing three-dimensional video content, the method comprising:
    inserting a plurality of components contained in a two-dimensional video frame into a plurality of samples included in a media data box in the media file, wherein the two-dimensional video frame corresponds to compressed three-dimensional video content;
    inserting, into a metadata box in the media file, a plurality of first tracks each corresponding to a type of the plurality of components, and a second track containing metadata; and
    inserting, into the second track, information about an entry point for each of the plurality of components inserted into the plurality of samples, for use in parsing the media file, wherein the second track further contains a list of the plurality of first tracks and a list of a plurality of versions of encoded each of the plurality of components.

2. The method of claim 1, wherein the media file is a file according to an ISO base media file format (ISOBMFF), the media data box is a mdat box, and the metadata box is a moov box.

3. The method of claim 1,
    wherein the three-dimensional video content contains a point cloud and is compressed into the two-dimensional video frame by video-based point cloud compression (V-PCC) technology,
    wherein the two-dimensional video frame contains a geometry image indicating position information of points included in the point cloud, a texture image indicating color information of the points, and an occupancy map image indicating information about pixels having information about the point cloud from among pixels of a two-dimensional image contained in the two-dimensional video frame, and
    wherein the metadata contains auxiliary information including information about patches obtained from the point cloud.

4. The method of claim 1, wherein the plurality of first tracks contain at least one of a geometry track containing information about an encoded geometry image, a texture track containing information about an encoded texture image, or an occupancy map track containing information about an encoded occupancy map image.

5. The method of claim 1, wherein the second track further contains at least one of a number of the plurality of first tracks referenced in the second track, data types of at least one of the plurality of first tracks, a type, a profile, and a level of a video coding specification used to encode data of the at least one of the plurality of first tracks, information indicating whether the data of the at least one of the plurality of first tracks is losslessly encoded, or track identifiers of the at least one of the plurality of first tracks.

6. The method of claim 1, wherein the second track further contains a point cloud compression (PCC) decoder configuration record and a PCC parameter set.

7. The method of claim 1, wherein the plurality of first tracks and the second track respectively contain identification information for identifying a group including a corresponding track.

8. The method of claim 1, further comprising:
    based at least in part on the information about the entry point and information of the list of the plurality of first tracks, obtain information about the plurality of first tracks without parsing the plurality of first tracks.

9. A device for transmitting three-dimensional video content, the device comprising:
    at least one processor configured to:
        generate a two-dimensional video frame in which three-dimensional video content containing point cloud data is compressed, and generate metadata necessary to reconstruct the three-dimensional video content from the two-dimensional video frame,
        encode the two-dimensional video frame, encapsulate the encoded two-dimensional video frame and the metadata into a media file, and
        packetize encapsulated data; and
    a communicator configured to transmit the packetized data,
    wherein the at least one processor is further configured to generate the media file by inserting a plurality of components contained in the encoded two-dimensional video frame into a plurality of samples included in a media data box in the media file, and inserting, into a metadata box in the media file, a plurality of first tracks each corresponding to a type of the plurality of components, and a second track corresponding to the metadata, and
    wherein the second track contains a list of the plurality of first tracks and a list of a plurality of versions of encoded each of the plurality of components and provides an entry point for each of the plurality of components inserted into the plurality of samples when the media file is parsed.

10. A method of receiving three-dimensional video content, the method comprising:
    reconstructing a media file by processing received packets;
    parsing the media file to extract an encoded two-dimensional video frame and metadata;
    decoding the encoded two-dimensional video frame; and
    reconstructing and outputting three-dimensional video content based on the two-dimensional video frame and the metadata,
    wherein the parsing of the media file includes:
        identifying a media data box and a metadata box contained in the media file,
        identifying, from the metadata box, a plurality of first tracks each corresponding to a type of a plurality of components contained in the encoded two-dimensional video frame, and a second track containing the metadata, and
        identifying, from the second track, a list of the plurality of first tracks, a list of a plurality of versions of encoded each of the plurality of components, and an entry point for each of the plurality of components in a plurality of samples in the media data box.

11. The method of claim 10, wherein the media file is a file according to an ISO base media file format (ISOBMFF), the media data box is a mdat box, and the metadata box is a moov box.

12. The method of claim 10,
    wherein the three-dimensional video content contains a point cloud, the encoded two-dimensional video frame is data in which the three-dimensional video content is compressed by video-based point cloud compression (V-PCC) technology,
    wherein the two-dimensional video frame contains a geometry image indicating position information of points included in the point cloud, a texture image indicating color information of the points, and an occupancy map image indicating information about pixels having information about the point cloud from among pixels of a two-dimensional image contained in the two-dimensional video frame, and wherein the metadata contains auxiliary information including information about patches obtained from the point cloud.

13. The method of claim 10, wherein the plurality of first tracks contain at least one of a geometry track containing information about an encoded geometry image, a texture track containing information about an encoded texture image, or an occupancy map track containing information about an encoded occupancy map image.

14. The method of claim 10, wherein the second track further contains at least one of a number of the plurality of first tracks referenced in the second track, data types of at least one of the plurality of first tracks, a type, a profile, and a level of a video coding specification used to encode data of the at least one of the plurality of first tracks, information indicating whether the data of the at least one of the plurality of first tracks is losslessly encoded, or track identifiers of the at least one of the plurality of first tracks.

15. The method of claim 10, wherein the second track further contains a point cloud compression (PCC) decoder configuration record and a PCC parameter set.

16. The method of claim 10, wherein the plurality of first tracks and the second track respectively contain identification information for identifying a group including each track, and wherein the three-dimensional video content is reconstructed based on a set of tracks having same group identification information.

* * * * *